United States Patent
Shibata et al.

(10) Patent No.: US 7,428,111 B2
(45) Date of Patent: Sep. 23, 2008

(54) CAMERA MODULE

(75) Inventors: Hisashi Shibata, Yamagata (JP);
Toshihiko Sato, Yamagata (JP)

(73) Assignee: Mitsumi Electric Co., Ltd., Yamagata (JP)

( * ) Notice: Subject to any disclaimer, the term of this patent is extended or adjusted under 35 U.S.C. 154(b) by 0 days.

(21) Appl. No.: 11/495,440

(22) Filed: Jul. 28, 2006

(65) Prior Publication Data

US 2007/0047109 A1    Mar. 1, 2007

(30) Foreign Application Priority Data

Aug. 31, 2005   (JP)   ............................. 2005-252851

(51) Int. Cl.
*G02B 7/02* (2006.01)
*H04N 5/225* (2006.01)

(52) U.S. Cl. ..................................... 359/811

(58) Field of Classification Search ................. 359/811, 359/819, 703, 704; 348/335, 340, 342; 250/208.1
See application file for complete search history.

(56) References Cited

U.S. PATENT DOCUMENTS 6,307,590 B1 *  10/2001  Yoshida ...................... 348/340
2004/0094825 A1 *  5/2004  Onishi et al. ................ 257/666

\* cited by examiner

*Primary Examiner*—Alicia M Harrington
(74) *Attorney, Agent, or Firm*—Patents + TMS, P.C.

(57) ABSTRACT

A camera module has a lens unit and an image pickup portion. The lens unit has at least one lens and a lens holder for holding the lens. The image pickup portion, which is provided below the lens unit, has a substrate, an image pickup device mounted on the substrate, a housing space for housing the image pickup device therein in a hermetically sealed state, and a base provided above the substrate. The base has an opening for introducing light passing through the lens to the image pickup device, a support portion located around the opening, and a recessed groove located around the support portion for holding a resin adhesive for bonding. The image pickup portion also has a filter having a peripheral portion bonded to an upper surface of the support portion so as to cover the opening.

2 Claims, 4 Drawing Sheets

PRIOR ART

PRIOR ART

CAMERA MODULE

This application claims priority to Japanese Patent Application No. 2005-252851 filed Aug. 31, 2005, which is hereby expressly incorporated by reference herein in its entirety.

BACKGROUND OF THE INVENTION

1. Field of the Invention

The present invention relates to a camera module, and more particularly to a relatively small camera module to be mounted on an electronic apparatus, such as, for example, a cellular phone.

2. Description of the Prior Art

A relatively small camera module is mounted on an electronic apparatus, such as, for example, a cellular telephone. Such a camera module includes an image pickup device, such as, for example, a CMOS sensor or a CCD sensor. FIG. 1 illustrates a cross-sectional view of a conventional camera module 11, and FIG. 2 is a plan view illustrating a base 131 and an IR cut filter 14 in the conventional camera module 11. FIG. 1 is a cross-sectional view taken generally along a line I-I of FIG. 2. As shown in FIG. 1, the camera module 11 has a lens unit 12 and an image pickup portion 13 provided under the lens unit 12.

The lens unit 12 includes a first lens 123, a second lens 124, a barrel 121 provided with the first lens 123 and the second lens 124 therein, and a lens holder 122 for rotatably holding the barrel 121. When the barrel 121 is rotated with respect to the lens holder 122, the barrel 121 is moved in a direction of an optical axis so that a focus adjustment is carried out.

The image pickup portion 13 includes a base 131 having a substantially rectangular opening 134 formed in an upper surface of the base 131, an IR cut filter 14 disposed so as to cover the opening 134 in the base 131, a substrate 16 provided below the base 131, and an image pickup device 15 of a CMOS sensor mounted on an upper surface of the substrate 16. As shown in FIG. 1, a housing space 133 for housing the CMOS sensor 15 in a hermetically sealed state is formed within the base 131. The housing space 133 is defined by the base 131, the IR cut filter 14, and the substrate 16.

The base 131 has an overhanging portion 135 for supporting the IR cut filter 14 around the opening 134. The overhanging portion 135 is illustrated as extending inwardly toward the housing space 133 in a horizontal direction with respect to FIG. 1. As shown in FIG. 2, peripheral edges of a rear face of the IR cut filter 14 are bonded to a support portion 132a which is located around the opening 134 in the base 131. The support portion 132a is provided at a position lower than the height of an upper surface 132b of the overhanging portion 132. A plurality of recesses 132c, 132d are formed outside of the support portion 132a. A resin adhesive is dropped into the recesses 132c, 132d. As shown in FIG. 1, each of the recesses 132c, 132d has a bottom surface 132g inclined from the upper surface 132b of the overhanging portion 135 toward the support portion 132a.

The peripheral edges of the IR cut filter 14 are bonded to the support portion 132a of the overhanging portion 135 with an adhesive. The bonding operation is conducted by dropping a proper amount of resin adhesive into the recesses 132c, 132d with use of a syringe. The resin adhesive dropped in the recesses 132c, 132d is guided by the inclined surfaces 132g of the recesses 132c, 132d and impregnated into gaps between the peripheral edges of the IR cut filter 14 and the support portion 132a. As a result, the IR cut filter 14 is bonded to the overhanging portion 132.

In the conventional camera module 11, when the peripheral edges of the IR cut filter 14 are to be bonded to the support portion 132a of the overhanging portion 132, it is necessary to strictly adjust the amount of resin adhesive to be dropped into the recesses 132c, 132d. Specifically, if the amount of resin adhesive dropped into the recesses 132c, 132d is larger than a proper value, the resin adhesive cannot remain in the gaps between the peripheral edges of the IR cut filter 14 and the support portion 132a and leaks into the opening 134 of the base 131. Alternatively, if the amount of resin adhesive dropped into the recesses 132c, 132d is smaller than the proper value, the resin adhesive cannot be impregnated into all the gaps between the peripheral edges of the IR cut filter 14 and the support portion 132a. As a result, the housing space 133 cannot maintain a hermetically sealed state to prevent dust from being attached to surfaces of the image pickup device 15.

Further, when the resin adhesive is adjusted so as to have a high viscosity in order to control the impregnation of the resin adhesive, the resin adhesive becomes unlikely to be impregnated into the gaps between the peripheral edges of the IR cut filter 14 and the support portion 132a. Alternatively, if the resin adhesive is adjusted so as to have a low viscosity, the resin adhesive leaks into the opening 134 of the base 131.

In order to resolve the above-mentioned problems, a skilled operator has to adjust a syringe manually during the bonding operation. However, the skilled operator has to await completion of the impregnation of the resin adhesive in order to confirm that the resin adhesive has been impregnated into the gaps between the peripheral edges of the IR cut filter 14 and the support portion 132a and has not leaked into the opening 134 of the base 131. Accordingly, it takes several minutes after completion of dropping a resin adhesive with use of a syringe to know whether a proper amount of resin adhesive has been dropped into the recesses 132c, 132d. This period of time required for confirmation lowers a working efficiency of the operator.

Further, the impregnation of the resin adhesive is also affected by other factors such as a temperature of a room in which the bonding operation is conducted. Accordingly, the amount of resin adhesive to be dropped into the recesses 132c, 132d should be adjusted according to factors, such as, for example, a temperature of a room in which the bonding operation is conducted. Thus, the adjustment of the amount of resin adhesive has to depend on experience of the skilled operator.

As described above, it is very difficult to adjust the amount of resin adhesive to be dropped into the recesses 132c, 132d. Further, such adjustment requires a skilled operator. Thus, efficiency of the bonding operation is lowered, and a manufacturing cost of the camera module is increased.

SUMMARY OF THE INVENTION

The present invention has been made in view of the above drawbacks. It is, therefore, an object of the present invention to provide a camera module which can reliably bond a filter to a base and facilitate adjustment of the amount of resin adhesive used for bonding of the filter.

According to an aspect of the present invention, a camera module is provided which can reliably bond a filter to a base and facilitate adjustment of the amount of resin adhesive used for bonding of the filter. The camera module has a lens unit and an image pickup portion. The lens unit includes at least one lens and a lens holder for holding the at least one lens. The image pickup portion is provided below the lens unit. The image pickup portion has a substrate, an image pickup device mounted on the substrate, a housing space for housing the image pickup device therein in a hermetically sealed state, and a base provided above the substrate. The base has an opening for introducing light passing through the at least one lens to the image pickup device in the housing space, a support portion located around the opening, and a recessed groove located around the support portion for holding a resin adhesive for bonding. The image pickup portion also includes a filter having a peripheral portion bonded to an upper surface of the support portion for covering the opening of the base.

Since the resin adhesive is accumulated within the recessed groove in the above arrangement, the resin adhesive is prevented from being impregnated directly into gaps between the peripheral portion of the filter and the upper surface of the support portion. Accordingly, the resin adhesive is unlikely to leak into the opening of the base. Thus, it is possible to facilitate adjustment of the amount of resin adhesive to be dropped with use of a syringe.

It is desirable that the recessed groove has a bottom located below the upper surface of the support portion. In this case, the resin adhesive is subjected to a force to pull back the resin adhesive to the groove, which is caused by molecular attraction of the resin adhesive. Accordingly, even if the amount of resin adhesive is larger than a proper value, the resin adhesive becomes unlikely to leak into the opening of the base. Thus, it is possible to facilitate adjustment of the amount of resin adhesive to be dropped with use of a syringe.

The base may include a plurality of recesses formed outside of the recessed groove and communicated with the recessed groove for introducing the resin adhesive into the recessed groove. In this case, the resin adhesive can readily be dropped into the recesses with use of a syringe. Further, the dropped resin adhesive efficiently flows into the entire recessed groove. Accordingly, the filter can reliably be bonded to the support portion.

It is desirable that each of the recesses has a surface inclined toward a bottom of the groove. Such an inclined surface facilitates introduction of the resin adhesive into the recessed groove.

Further, it is desirable that a plurality of filter positioning portions are formed between the recesses so as to abut edges of the filter to position the filter in place when the filter is bonded to the support portion. Such filter positioning portions facilitate positioning of the filter during bonding operation of the filter.

The above and other objects, features, and advantages of the present invention will be apparent from the following description when taken in conjunction with the accompanying drawings which illustrate preferred embodiments of the present invention by way of example.

DETAILED DESCRIPTION OF THE INVENTION

Figure 1:
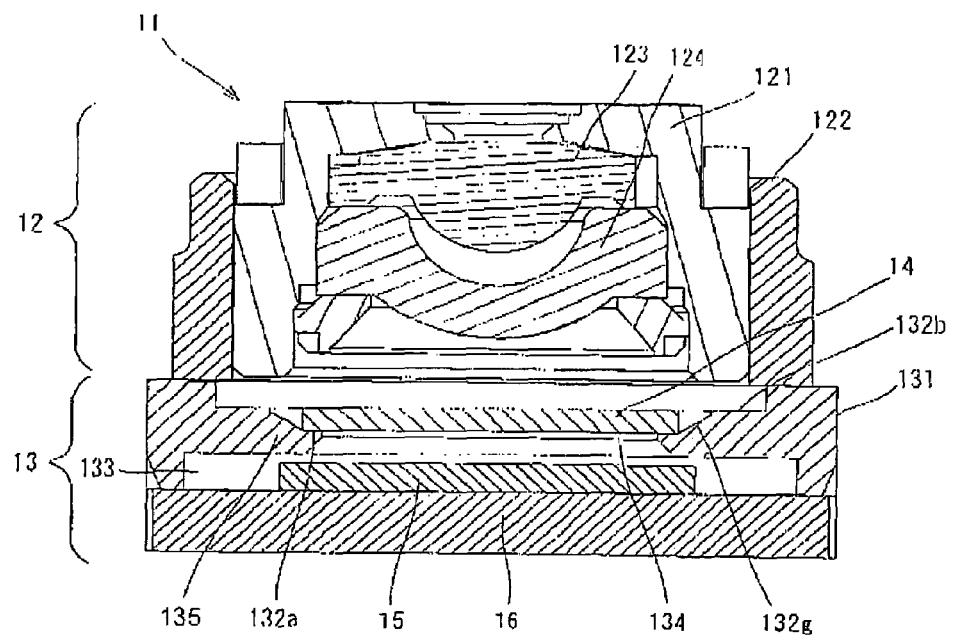
FIG. 1 is a cross-sectional view of a conventional camera module.
Figure 2:
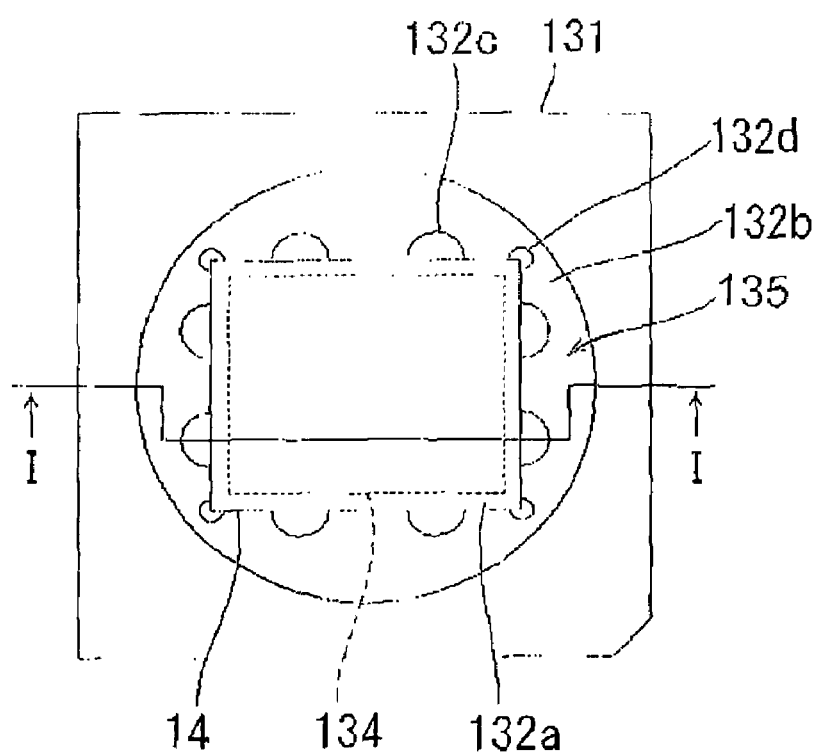
FIG. 2 is a plan view of a base and an IR cut filter in the conventional camera module of FIG. 1.
Figure 3:
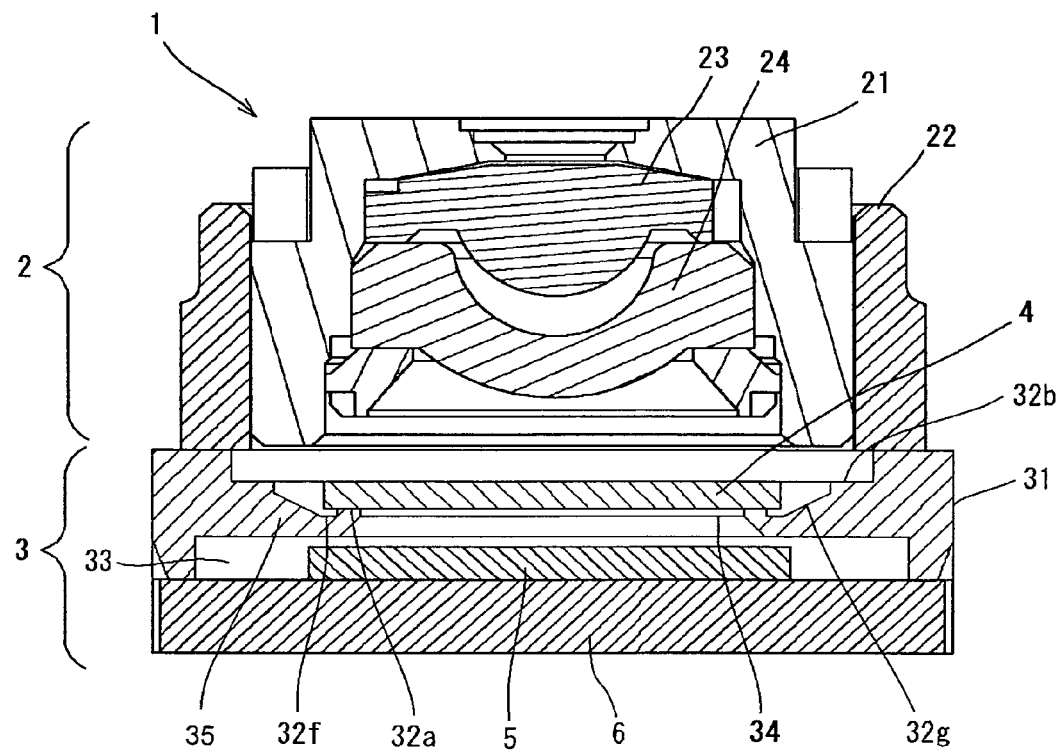
FIG. 3 is a cross-sectional view of a camera module according to an embodiment of the present invention.
Figure 4:
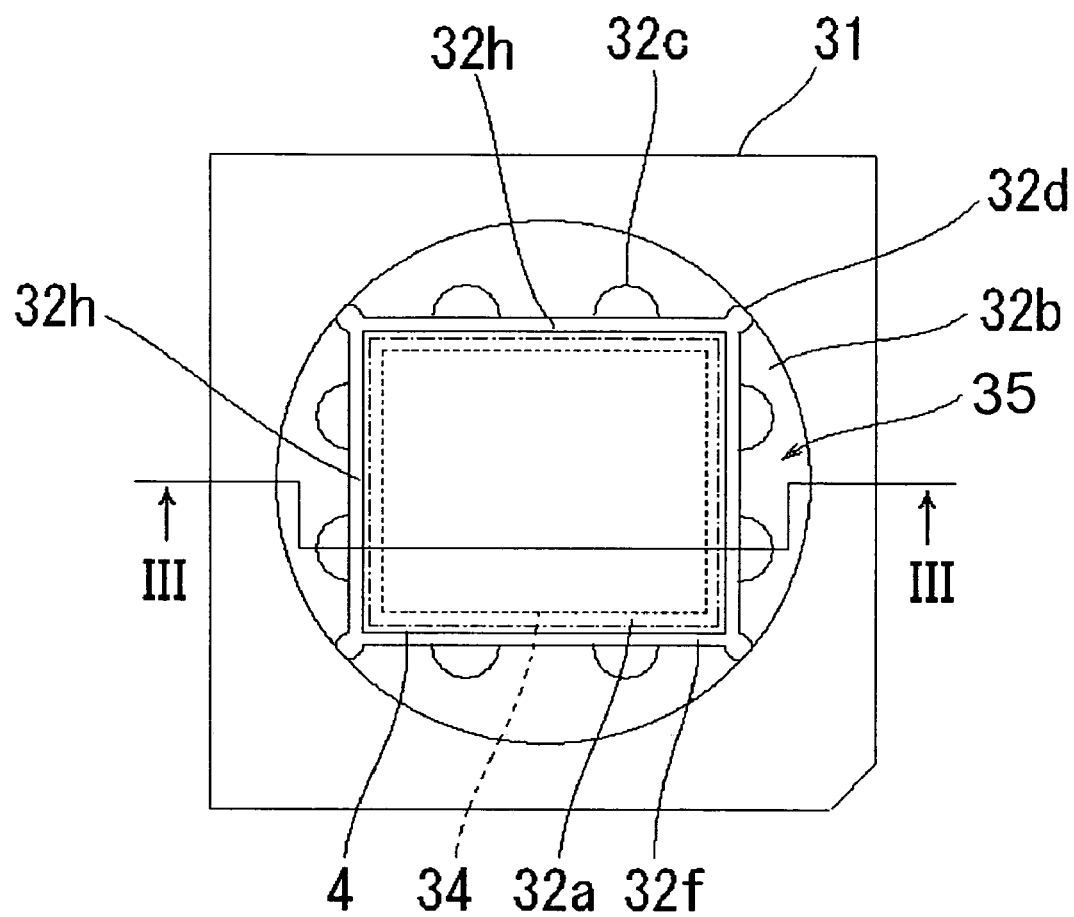
FIG. 4 is a plan view of a base and an IR cut filter in the camera module shown in FIG. 3.

A camera module according to an embodiment of the present invention will be described below with reference to FIGS. 3 and 4. FIG. 3 is a cross-sectional view of a camera module 1 in an embodiment of the present invention. FIG. 4 is a plan view of a base 31 and an IR cut filter 4 in the camera module 1 in FIG. 3. FIG. 3 is a cross-section generally taken along a line III-III of FIG. 4. As shown in FIG. 3, the camera module 1 has a lens unit 2 and an image pickup portion 3 provided below the lens unit 2.

The lens unit 2 has a first lens 23, a second lens 24, a barrel 21 housing the first lens 23 and the second lens 24, and a lens holder 22 for rotatably supporting the barrel 21. When the lens holder 22 is rotated, the barrel 21 moves in a direction of an optical axis so as to control a focus of the camera module 1. For example, the first lens 23 and the second lens 24 are provided as an optical system in the camera module 1. However, the camera module 1 may have an optical system having another arrangement.

The image pickup portion 3 has an image pickup device 5 housed in a housing space 33 formed therein, a substrate 6 on which the image pickup device 5 is mounted, and a base 31 provided above the substrate 6. The base 31 has an opening 34 formed therein for introducing light passing through the lens 23 and 24 into the image pickup device 5. The image pickup portion 3 also has an IR cut filter 4 disposed so as to cover the opening 34 of the base 31. The housing space 33 is defined in a hermetically sealed state by the substrate 6, the base 31, and the IR cut filter 4.

The base 31 has a support portion (bonding portion) 32a located around the opening 34. The support portion 32a is substantially in the form of a rectangular frame and serves to support a peripheral portion of a rear face of the IR cut filter 4. The base 31 also has a recessed groove 32f located around the support portion 32a for holding a resin adhesive for bonding.

The substantially rectangular opening 34 is formed at a central portion of the base 31. The base 31 has an overhanging portion 35 located around the opening 34. As shown in FIG. 4, the overhanging portion 35 is substantially in the form of a circular recess. The overhanging portion 35 extends inwardly toward the housing space 33 in a horizontal direction. The overhanging portion 35 has an upper surface 32b.

The peripheral portion of the IR cut filter 4 is placed on the support portion 32a of the overhanging portion 32, which is provided outside of the opening 34 of the base 31, and bonded to the support portion 32a of the overhanging portion 35 by a resin adhesive. As shown in FIG. 4, the peripheral portion of the IR cut filter 4 is bonded to an upper surface of the support portion 32a which overlaps the peripheral portion of the IR cut filter 4 by a resin adhesive. The upper surface of the support portion 32a is located above a bottom of the groove 32f.

As described above, the recessed groove 32f is formed outside of the support portion 32a of the overhanging portion 32. The recessed groove 32f has a bottom located below the upper surface of the support portion 32a. As shown in FIG. 4, a plurality of recesses 32c, 32d are formed outside of the groove 32f. The recesses 32c, 32d are communicated with the groove 32f and thus used to drop a resin adhesive into the groove 32f. As shown in FIG. 3, each of the recesses 32c, 32d has a surface 32g inclined from the upper surface 32b of the overhanging portion 35 toward the bottom of the groove 32f. Further, a plurality of filter positioning portions 32h are provided between the recesses 32c, 32d. The filter positioning portions 32h abut edges of the IR cut filter 4 so as to position the IR cut filter 4 in place when the IR cut filter 4 is to be bonded to the base 31.

In an embodiment of the present invention, the overhanging portion 35 is formed integrally with the base 31. However, the overhanging portion 35 may be formed separately from the base 31. Further, the IR cut filter 4 is employed as an example of a filter in the present embodiment. However, the IR cut filter 4 may be replaced with other filters, a transparent glass or a transparent resin plate for protecting the image pickup device 5.

A bonding process of the IR cut filter 4 will be described below with effects of the present embodiment.

First, the IR cut filter 4 is placed on the support portion 32a of the overhanging portion 32. The edges of the IR cut filter 4 are brought into abutment against the filter positioning portions 32h so that the IR cut filter 4 is positioned in horizontal directions.

Then, a proper amount of resin adhesive is dropped into the recesses 32c, 32d with use of a syringe. Since the recesses 32c, 32d are communicated with the groove 32f, the resin adhesive dropped into the recesses 32c, 32d efficiently flows into the entire groove 32f. Specifically, the resin adhesive is guided by the inclined surfaces 32g of the recesses 32c, 32d and introduced into the groove 32f. The resin adhesive is then accumulated within the groove 32f. Thus, the resin adhesive is prevented from being impregnated directly into gaps between the peripheral portion of the IR cut filter 4 and the upper surface of the support portion 32a. As a result, the resin adhesive is unlikely to leak into the opening 34 of the base 31.

When a liquid surface of the resin adhesive that has been accumulated within the groove 32f reaches the peripheral portion of the IR cut filter 4, the resin adhesive is impregnated into the gaps between the peripheral portion of the IR cut filter 4 and the upper surface of the support portion 32a by a seepage force of the resin adhesive. However, the resin adhesive is subjected to a force to pull back the resin adhesive to the groove 32f, which is caused by molecular attraction of the resin adhesive. As a result, the resin adhesive does not leak into the opening 34 of the base 31. Even if the amount of resin adhesive dropped into the recesses 32c, 32d is larger than a proper value, the resin adhesive is impregnated into the gaps between the peripheral portion of the IR cut filter 4 and the upper surface of the support portion 32a by a seepage force of the resin adhesive but does not leak into the opening 34 of the base 31.

In an embodiment, the groove 32f is formed so as to surround four sides of the support portion 32a. However, if the groove 32f cannot be formed around the four sides of the support portion 32a because of technical constraints such as part shapes, the groove 32f may be formed only around one, two, or three sides of the support portion 32a. Further, although the IR cut filter 4 is bonded to the upper surface of the base 31 in the present embodiment, the IR cut filter 4 may be bonded to a lower surface of the base 31.

Finally, it should be understood that the present invention is not limited to the preferred embodiments described hereinabove and, needless to say, a variety of modifications or variations may be made without departing from the scope of the invention defined in the following claims.

Further, it is also to be understood that the present disclosure relates to subject matter contained in Japanese Patent Application No. 2005-252851 (filed on Aug. 31, 2005) which is expressly incorporated herein by reference in its entirety.

We claim:

1. A camera module comprising:
   a lens unit having at least one lens and a lens holder for holding the at least one lens; and
   an image pickup portion provided below the lens unit, the image pickup portion including:
   (i) a substrate,
   (ii) an image pickup device mounted on the substrate,
   (iii) a housing space for housing the image pickup device therein in a hermetically sealed state,
   (iv) a base provided above the substrate wherein the base and the substrate define the housing space and further wherein the base includes:
      (a) an opening for introducing light passing through the at least one lens to the image pickup device provided in the housing space,
      (b) a support portion located around the opening to define the opening therein, wherein the support portion has an upper surface and a perimeter located at a side opposite to the opening
      (c) a recessed groove located around and outside the perimeter of the support portion wherein the recessed groove holds a resin adhesive for bonding and further wherein the recessed groove has a bottom surface, and
      (d) a plurality of recesses that are formed outside the recessed groove so as to be in communication with the recessed groove for introducing the resin adhesive into the recessed groove wherein each of the plurality of recesses has a bottom surface inclined in a direction toward the bottom surface of the recessed groove, and
   (v) a filter having a peripheral portion bonded to the upper surface of the support portion by the resin adhesive held in the recessed groove so as to cover the opening of the base.

2. The camera module of claim 1 wherein the base further includes a plurality of filter positioning portions each formed between the plurality of recesses so as to abut edges of the filter to position the filter in place when the filter is to be bonded to the support portion.

* * * * *